United States Patent
Cairns et al.

(10) Patent No.: US 8,068,535 B2
(45) Date of Patent: Nov. 29, 2011

(54) ROBUST ITERATIVE LINEAR SYSTEM SOLVERS

(75) Inventors: Douglas A. Cairns, Durham, NC (US); Stephen Grant, Cary, NC (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 839 days.

(21) Appl. No.: 12/058,494

(22) Filed: Mar. 28, 2008

(65) Prior Publication Data

US 2009/0245441 A1    Oct. 1, 2009

(51) Int. Cl.
*H04B 1/00* (2006.01)
(52) U.S. Cl. .................. 375/148; 375/140; 375/147
(58) Field of Classification Search .............. 375/148
See application file for complete search history.

(56) References Cited

U.S. PATENT DOCUMENTS

| | | | |
|---|---|---|---|
| 2003/0103212 A1* | 6/2003 | Westphal et al. | 356/479 |
| 2004/0125893 A1* | 7/2004 | Gazor | 375/324 |
| 2006/0062283 A1* | 3/2006 | Zhang et al. | 375/147 |
| 2007/0280371 A1* | 12/2007 | Bouvet et al. | 375/267 |
| 2008/0019429 A1* | 1/2008 | Reznik | 375/148 |
| 2008/0090575 A1* | 4/2008 | Barak et al. | 455/444 |
| 2009/0191814 A1* | 7/2009 | Blu et al. | 455/63.1 |
| 2010/0027590 A1* | 2/2010 | Alebachew et al. | 375/148 |
| 2010/0303132 A1* | 12/2010 | Jonsson et al. | 375/148 |

FOREIGN PATENT DOCUMENTS

WO    WO 2006037593 A1    4/2006

OTHER PUBLICATIONS

Qing Zhao et al "Convergence behavior of iterative phase synchronization and detection," Selected Areas in Communications, IEEE Journal on , vol. 23, No. 5, pp. 932-943, May 2005.

* cited by examiner

*Primary Examiner* — David C. Payne
*Assistant Examiner* — Erin File (57) ABSTRACT

In receiving equipment such as a mobile terminal (1) for decoding received signals coded according to a CDMA method are decoded in an intermediate processor (9). In the decoding, coefficients or elements of a vector w are calculated in a unit or module (13) by an iterative method as a solution to a system of linear equations represented by the matrix equation $Rw=h$, where R is a matrix of known elements and h is a known vector. For terminating the iteration, a value of the signal to interference plus noise ratio SINR for the received signals is calculated in each iteration step and then this calculated value or a quantity derived therefrom is used as a stopping criterion or generally in a stopping algorithm.

12 Claims, 6 Drawing Sheets

ROBUST ITERATIVE LINEAR SYSTEM SOLVERS

FIELD OF THE INVENTION

The present invention relates to methods performed in receiving and decoding signals transmitted according to some CDMA method, such as in RAKE receivers.

BACKGROUND

In the context of RAKE receivers, and in particular generalized Rake (G-RAKE) receivers, problems of the form $$Rw = h \quad (1)$$

arise. Here, R is an N×N matrix that can be an impairment covariance matrix with known values, h is an N×1 vector with known values, which are net channel coefficients, and w is an N×1 vector that needs to be determined and contains combining weights. Methods like Gaussian elimination, LU decomposition, QR factorization, or other known methods can be employed to solve for the unknown vector w. These methods typically require $O(N^3)$ (i.e. "of the order of $N^3$") operations to determine w, which may be too computationally complex for many applications. Also, the aforementioned methods may encounter numerical problems if the matrix R is ill-conditioned.

An alternate method of solving equation (1) for w is to use an iterative method. Iterative algorithms generally exploit some property of matrix R to recursively solve for the unknown vector w. An iterative linear system solver starts with some initial guess for the unknown vector w and then refines the estimate of w with each iteration. As an example, consider the following iterative formulation $$w^{i+1} = w^i + g(r^i)$$

$$r^{i+1} = f(h - Rw^{i+1}) \quad (2)$$

Here, $r^{i+1}$ is the residual error vector at iteration i+1, $f(h-Rw^{i+1})$ indicates an expression that is a function of the combining weights at iteration i+1 (e.g. $f(h-Rw^{i+1})=h-Rw^{i+1}$), and $g(r^i)$ indicates an expression that is a function of the $i^{th}$ residual error vector (e.g.

$$g(r^i) = \frac{(p^{i+1})^T r^i}{(p^{i+1})^T R p^{i+1}},$$

where $p^{i+1} = r^i + \beta^{i+1} p^i$ and $$\beta^{i+1} = \frac{-(p^i)^T R r^i}{(p^i)^T R p^i}.$$

Here $w^0$ represents the initial guess at the solution and $r^0$ is the residual error due to the initial guess. Many iterative algorithms fit into the framework of the equations (2), but other formulations are possible.

Iterative linear systems solvers are not necessarily guaranteed to converge to the true solution to equation (1), but these algorithms generally determine a solution that is "close" to the right answer. The advantages of employing an iterative method include reduced complexity, numerical tractability, and/or less sensitivity to near-singularity of the matrix R. There is, however, one major disadvantage of using an iterative algorithm. The disadvantage is that it is often unclear how many iterations are required to achieve an answer that is "good enough". This disadvantage will herein be called the stopping criteria problem.

There are at least two general methods of solving the stopping criteria problem.

Empirical Experimentation

In this method a number of representative Rw=h problems for an intended application are solved using an iterative algorithm. The number of iterations required to determine a "good enough" solution are recorded for each problem. The ultimate number of iterations employed in practice for such problems would then be a function of the maximum number needed to solve any one of the representative problems.

This method has at least two problems. First, if the matrix R is ill-conditioned for some reason, the number of iterations determined for representative Rw=h problems may in practical use result in very poor solutions. This in turn may affect other parts of the application that depend on a reliable solution to Rw=h. A poor solution for the combining weights could e.g. cause an extremely high block error rate. The second problem associated with this method is that it may not be possible to determine a representative set of Rw=h problems. In such cases, it is likely that this method will set the iteration requirements higher than needed for some, or most, Rw=h problems. In this case, computation power is wasted on extra iterations.

Adaptive Stopping Criteria

This approach can be used alone or in combination with the empirical experimentation approach. The idea here is to compute a metric of the fidelity of the solution and halt the iterative process when the metric crosses a threshold. One example of such a metric is $\rho^i = \|h - Rw^i\|_2^2$, where $\|q\|_2$ is the 2-norm of vector q. This metric is compared to $\epsilon \|h\|_2^2$ where $\epsilon$ is some small predetermined quantity and the iterative process stopped when $\rho^i < \epsilon \|h\|_2^2$.

This method has as well at least two problems. First, no experimental evidence has been found that shows that it prevents divergence if the matrix R is ill-conditioned. Second, the choice of the value of the quantity E requires some experimentation in order to get reasonable performance. As with the empirical experimentation method, it may not be possible to determine a representative set of Rw=h problems from which values of the quantity E can be chosen. Therefore, $\epsilon$ may be chosen so small that some, or at least most, Rw=h problems will use more iterations than necessary. Again, computational power is wasted.

SUMMARY

It is an object of the invention to provide a quantity that can be efficiently used in an iterative algorithm for searching for a solution to a linear equation system or to a simple matrix equation.

It is another object of the invention to provide an efficient method of finding combining weights for RAKE receivers, in particular generalized RAKE (G-RAKE) receivers.

Thus generally, in receiving equipment for demodulating received signals modulated is according to a CDMA method, the signal to interference plus noise ratio (SINR) for received signals or a quantity derived therefrom is used in a stopping condition or stopping algorithm for iterative linear systems solvers, i.e. in iterative methods searching for a solution to the equation $R_u w = h$, where the matrix R, and the vector h are known and w is a vector searched for to be used in the demodulating circuits for producing the demodulated signals.

The signal to interference plus noise ratio $SINR^i$ can generally, in each of the successive iteration steps, be calculated according to the ratio of signal power, computed as a function of $w^i$ and h, to interference plus noise power, computed as a function of $w^i$ and $R_u$, where i is the order number of the iteration step and the vector $w^i$ is the approximate value of the vector w searched for as calculated in the $i^{th}$ iteration step. h is then, for the mentioned special applications, taken as the net channel coefficient vector and $R_u$ is the impairment covariance matrix, these two latter quantities being constant during the iterative process.

The signal to interference plus noise ratio can in particular be calculated according to $$SINR^i = \frac{|(w^i)^H h|^2}{(w^i)^H R_u w^i} \quad (3)$$

A quantity which is calculated according to equation (3) or a quantity derived therefrom can also generally be used in a stopping condition or stopping algorithm in iterative methods searching for a solution to the equation $R_u w = h$, where the matrix $R_u$ and the vector h are known and w is a vector searched for.

The quantity SINR can be used in alternative ways in different algorithms.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 4b is similar to FIG. 3b but for computing combining weights according to the method, the steps of which are illustrated in FIG. 4a.

DETAILED DESCRIPTION

Figure 1:
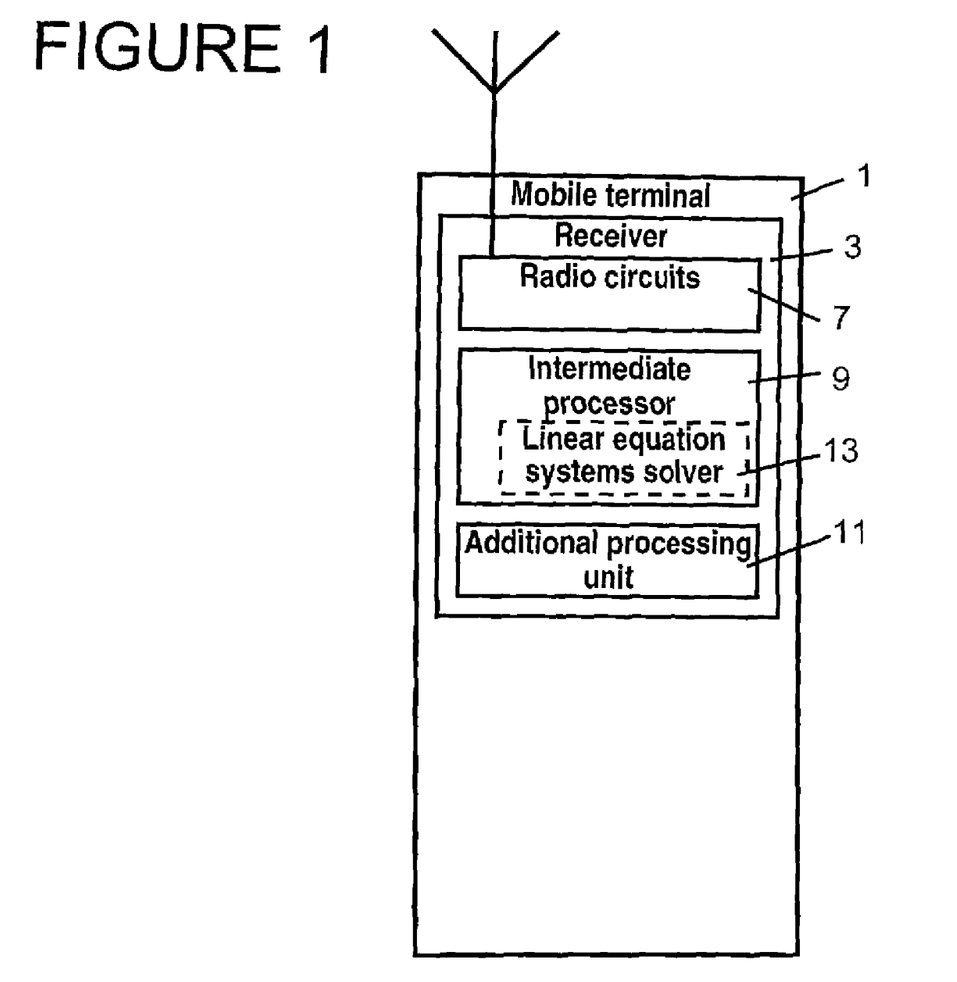
FIG. 1 is a schematic block diagram of the receiver parts of a mobile terminal.

FIG. 1 is a schematic of the receiver part 3 of a mobile terminal 1 or other communication device for use in a wireless communication network, not shown. Signals from the network that represent some original information such as speech, music and graphics are received by an antenna 5, the received signals including the original transmitted signals plus noise and interference. The received signals are first processed by a radio circuit 7 that generates received signal samples, the processing including e.g. filtering and conversion to a digital format. The processed signals which thus include a series of digitized baseband signal samples are output to a processor 9. The processor demodulates the baseband signal samples and produces soft values or bit estimates of the originally transmitted signals. The bit estimates are output to an additional processing unit 11 for final processing including e.g. forward-error-correction (FEC) decoding and conversion into information directly representing the original speech, music, text or graphical images, etc.

In the signal processing such as in the processor 9 some rather complicated mathematical operations may be performed including solving systems of linear equations where such operations can be performed by a specially adapted unit or module 13.

Figure 2:
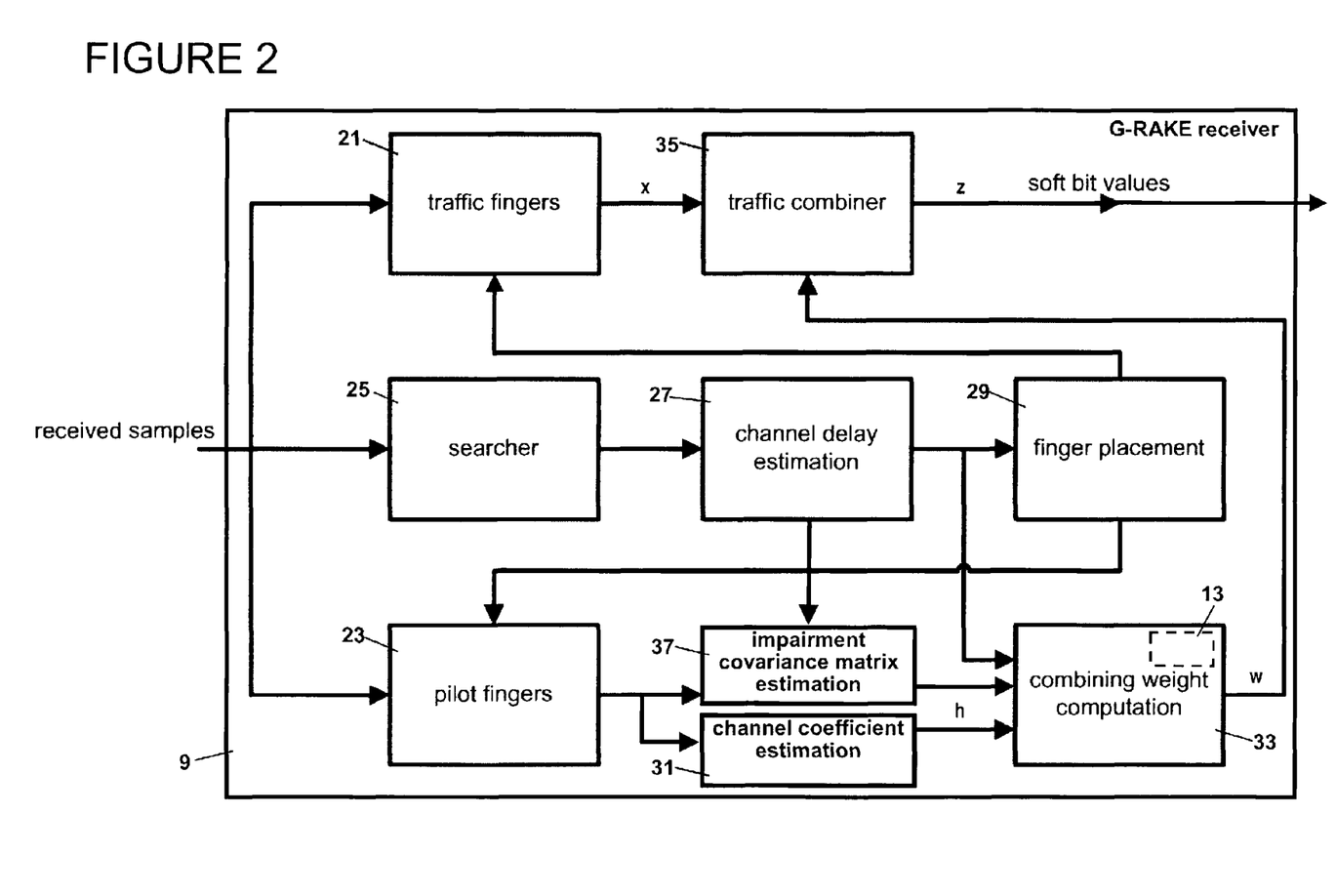
FIG. 2 is a schematic block diagram of a G-RAKE receiver for use as an intermediate processor in the mobile terminal of FIG. 1.

The intermediate processor 9 can in particular be a RAKE processor/receiver, e.g. a generalized RAKE (G-RAKE) processor. A block diagram of an exemplary G-RAKE receiver is seen in FIG. 2.

The G-RAKE receiver 9 includes a plurality of traffic fingers symbolically shown as the block 21 and an equal number of pilot fingers shown as the block 23. The traffic fingers and pilot fingers receive the baseband signal samples output from the radio circuit 7.

The baseband signal samples are also received by a searcher unit 25 which produces an estimate of the channel power-delay profile. The power-delay profile is utilized by the channel delay estimation unit 27 to estimate the channel delays. The channel delays are delivered to a finger placement circuit 29. The finger placement circuit determines the delays $d=[d_1, d_2, \ldots, d_N]^T$ which are used in despreading in the traffic fingers 21 and pilot fingers 23. The despread values from the pilot fingers are used by a channel coefficient estimation circuit 31 and an impairment covariance estimation circuit 37. The channel coefficient estimation circuit produces estimates of net channel coefficients $h=[h_1, h_2, \ldots, h_N]^T$. The impairment covariance estimation circuit 37 produces an estimate of the impairment covariance matrix using the channel delays, finger delays, and net channel coefficients according to some method known in the prior art such as that disclosed in the published U.S. patent application 2005/0201447A1. The net channel coefficients h and the impairment covariance matrix $R_u$ are passed to a circuit 33 for calculating combining weights. The combining weights $w=[w_1, w_2, \ldots, w_N]^T$ are input to a traffic combiner circuit 35 that receives the output of the traffic fingers 21 and uses the combining weights to process said output to produce the desired soft bit values.

In operation, received samples are used by the searcher unit 25 to calculate a power-delay profile. This power-delay profile is provided to the channel delay estimation circuit 27 which calculates channel delay estimates. These delays are in turn used in the finger placement circuit 24 to command the traffic fingers 21 and the pilot fingers 23 accordingly to delay either the received signal sample stream or the spreading codes used by the individual RAKE fingers in the traffic fingers 21 and the pilot fingers 23, respectively, to produce traffic $x^t=[x_1^t, x_2^t, \ldots, x_N^t]^T$ and pilot $x^p=[x_1^p x_2^p, \ldots, x_N^p]^T$ correlation (despread) values according to the various finger placements. The combining weight computation circuit 33, which computes the RAKE combining weights $w^t=[w_1, w_2, \ldots, w_N]^T$ used to combine, in the combiner circuit 35, the RAKE finger signals $x^t=[x_1^t x_2^t, \ldots, x_N^t]^T$ output from the traffic fingers 21. It may also compute an SINR estimate. The signals output from the traffic fingers 21 are in the traffic combiner circuit 35 combined using the combining weights calculated in the combining circuit 33 to produce combined values or soft bit values z.

Each of the traffic fingers 21, also called RAKE fingers or correlation units, are thus placed at a desired delay, i.e. a relative time offset, with respect to the received signal using correlation code offsets and/or adjustable delay elements, such as buffers.

The circuit 33 for calculation of the combining weights uses an impairment covariance matrix $R_u$ and the net channel coefficients $h=[h_1, h_2, \ldots, h_N]^T$ to calculate the combining weights $w=[w_1, w_2, \ldots, w_N]^T$ according to the equation $$R_u w = h$$

This calculation is made in a special module that is included in the circuit 33 and is the linear systems solver circuit 13 mentioned above. In this special module the desired values for the elements of the vector w are calculated by an iterative method producing iterated vectors $w^0, w^1, w^2, \ldots$ where the first vector $w^0$ is composed from some initial values. In each iteration step the difference $(h-R_u w^i)$ is calculated and it is desired to find a $w^i$ that makes the difference as close to the zero vector as possible, a measure thereof in a simple case e.g. being given by the 2-norm $\|h-R_u w^i\|_2$ that then should be made close to zero. New iterated values can generally be calculated according to $w^{i+1}=w^i+g(r^i)$.

For example, the signal to interference plus noise ratio (SINR) that can e.g. be calculated according to $$SINR^i = \frac{|(w^i)^H h|^2}{(w^i)^H R_u w^i}$$

or a quantity derived therefrom can be used in a method for stopping the iterations, so that the iterations are stopped when e.g. the successively calculated values of the signal to interference plus noise ratio have a specific, predetermined behaviour.

Methods of using the signal to interference plus noise ratio in a terminating or stopping method will now be described.

Improved Adaptive Stopping Criteria

The SINR (Signal to Interference plus Noise Ratio) can thus be used as the critical quantity in an adaptive stopping algorithm. Specifically, the iterative algorithm will terminate when for an i:th iteration the condition $SINR^i > SINR^{i-1}$ is not fulfilled. To ensure that a reasonable number of iterations is employed, this criterion may e.g. be used in conjunction with some other method such as the empirical method used according to the prior art. Thus, a maximum number $N_{iter}$ of iterations is determined using a suitable method such as the empirical one, and the stopping algorithm is employed to detect when the iterative method starts to diverge from the true solution.

This embodiment specifically addresses situations where the $R_u$ matrix (corresponds to the matrix R mentioned in the general discussion above), is ill-conditioned and terminates the iterative process before the solution can start to diverge. It should be observed here that the assumption is that the SINR increases monotonically until the best solution is reached. This method can also, if desired, be used in conjunction with the adaptive stopping criterion described in the prior art.

Figure 3A:
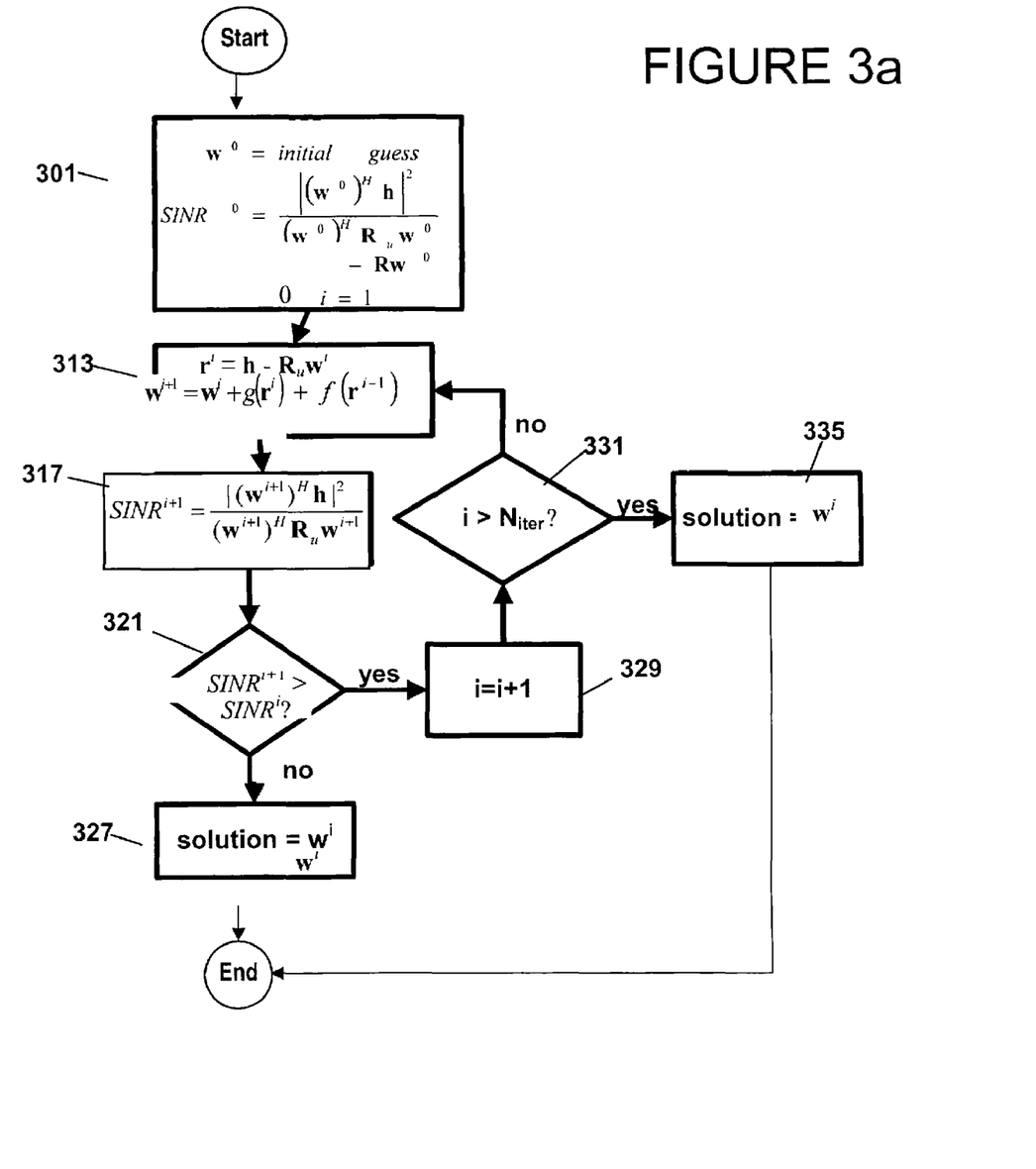
FIG. 3a is a flow chart of steps included in a method for calculating combining weights for use in a RAKE receiver and similar devices.
Figure 3B:
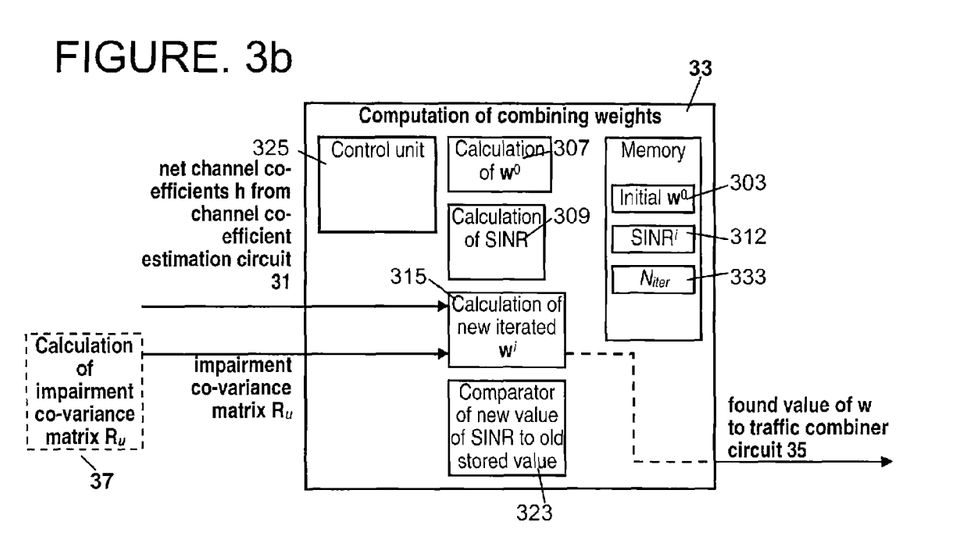
FIG. 3b is a block diagram of a circuit for computing combining weights using the method, the steps of which are illustrated in FIG. 3a, FIG. 4a is a flow chart similar to that of FIG. 3a for an alternative method of calculating combining weights.

The method for calculating the combining weights using the SINR in this way is illustrated in the flow chart of FIG. 3a and can be performed by modules such as those illustrated in the block diagram of FIG. 3b. In a first step 301 an initial guess $w^0$ for the weight vector is made, such as retrieved from a memory cell 303 or calculated in some way by an initial value module 307. In the same step the $SINR^0$ for this guessed vector is calculated such as by a module 309 that has received the current net channel coefficients h from the channel coefficient estimation circuit 31. This module also uses the impairment covariance matrix $R_u$ received from the circuit 37. The calculated value of SINR is stored in a memory cell 312. An initial error residual $r^0=h-R_u w^0$ is calculated. In this step also, a counter i is set to the value 0.

In the next step 313 a new iterated weight vector $w^{i+1}$ is calculated using e.g. a suitable function g that uses the error residual $r^i$ as an argument according to $w^{i+1}=w^i+g(r^i)$. This can be performed by a module 315. The new error residual $r^{i+1}=h-R_u w^{i+1}$ is also calculated in step 313. In step 317 and in the block 309 the value for the signal to interference plus noise ratio $SINR^{i+1}$ for the new weight vector is calculated. Then it is asked in a step 321 whether the former value $SINR^i$ is smaller than the value $SINR^{i+1}$ now calculated. This can be performed by a comparator 323 taking the former SINR-value from the memory cell 312. If it is determined that the former value $SINR^i$ is not smaller than the value $SINR^{i+1}$ now calculated, where this determining can be performed by a control unit 325, it is an indication that the iterative method starts to diverge and then probably the best guess of the weight vector is $w^i$. The calculation is terminated, as commanded by the control unit that also controls the execution of the steps in the various other modules, and the last determined weight vector is output to the traffic combiner circuit 35, see block 327.

If it is determined that the former value $SINR^i$ is smaller than the value $SINR^{i+1}$, the now calculated value $SINR^{i+1}$ is stored in the memory cell 312 and the counter i is incremented in a step 329. Then it is decided in a step 331 whether now a sufficient number of iterations have been performed by comparing the current value of the counter i to the maximum number $N_{iter}$, that can e.g. be stored in a memory cell 333. If the value of the counter i is not higher than $N_{iter}$, more iterations can be performed and next the step 313 is again performed. Instead, if the value of i is higher than the maximum $N_{iter}$ no iterations will performed and the last calculated $w^i$ is taken to be a sufficiently good guess of the weight vector. The calculation is terminated and this last determined weight vector is output to the traffic combiner circuit 35, see block 335.

Best Solution Reported

In this method the SINR is specifically used as a metric for determining the best solution over all iterations. This criterion can be used together with the empirical method alone, or with the empirical method plus the adaptive stopping criterion method. The method basically includes that for each iteration, the current SINR is compared to the maximum SINR obtained over all iterations up to the current iteration. If the current SINR is greater than the maximum SINR, then the current SINR becomes the maximum SINR and the current iteration estimate for w becomes $w_{best}$, i.e. $w_{best}=w^{i+1}$. When all iterations are complete, the solution estimate is given by $w_{best}$. This embodiment is illustrated as an enhancement of the empirical method in the flow-chart of FIG. 4a. This embodiment also addresses situations where the $R_u$ matrix is ill-conditioned. However, unlike the previous embodiment there is no assumption of a monotonic convergence to the true solution.

Figure 4A:
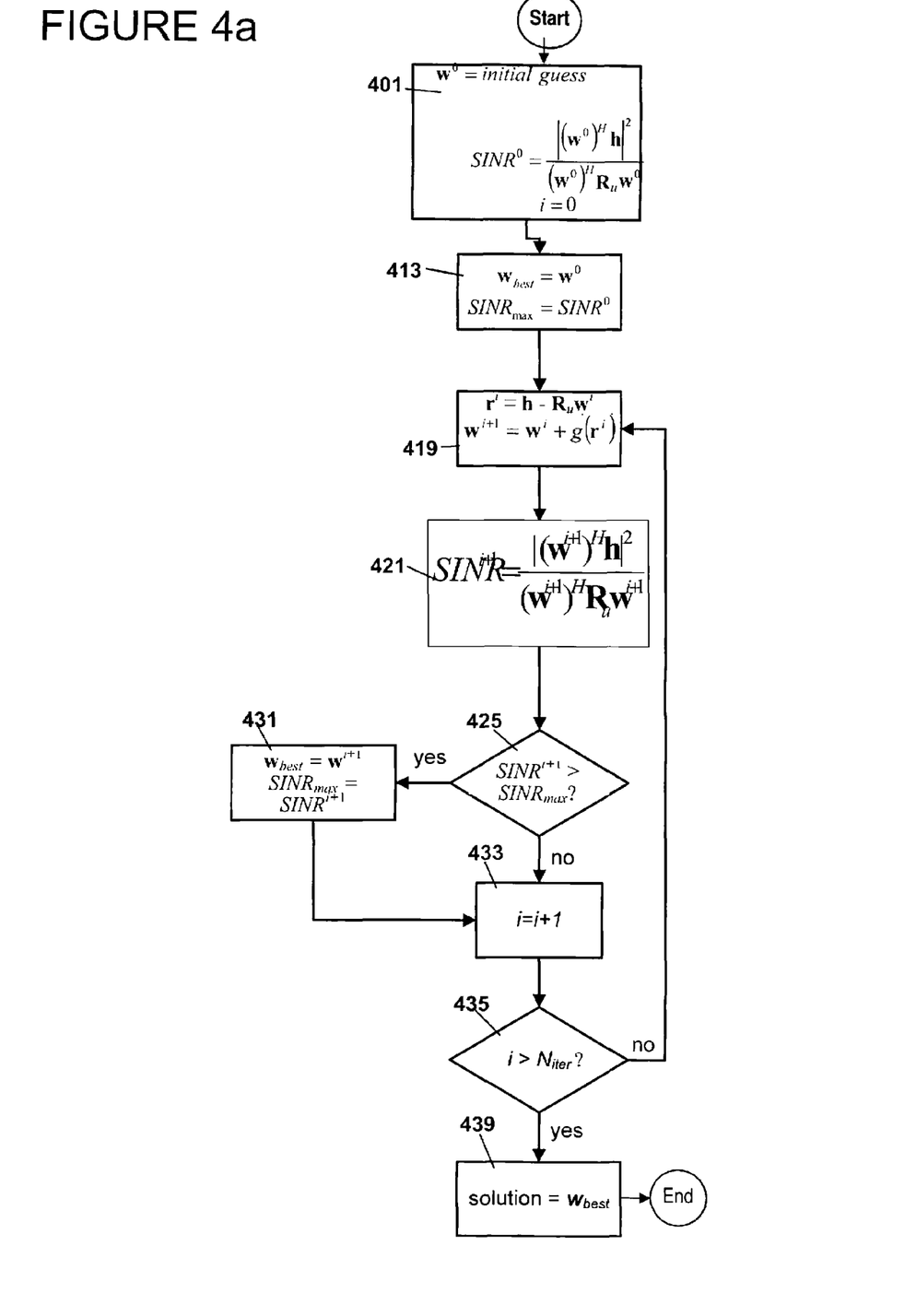
Figure 4B:
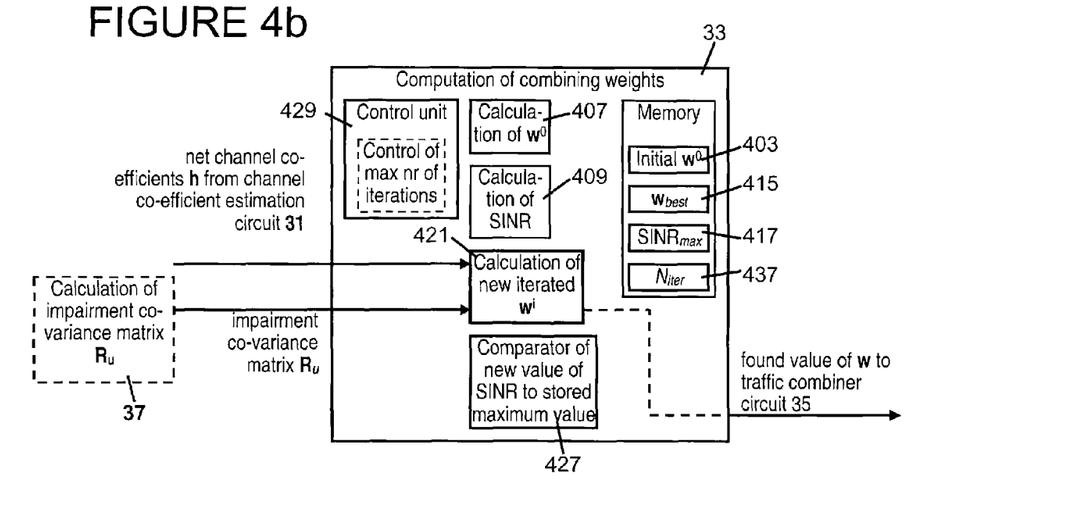

A method for calculating the weights using the SINR according to this method is illustrated in the flow chart of FIG. 4a and can be performed by suitably adapted modules, e.g. as illustrated in the block diagram of FIG. 4b. In the first step 401 an initial guess $w^0$ for the weight vector is made, such as by fetching vector element values from a memory cell 403 or calculating them in some way in a particular module 407. In the same step the $SINR^0$ for this guessed vector is calculated such as by a module 409 that has received the current net channel coefficients h from the channel coefficient estimation circuit 31. The calculation module also uses the impairment covariance matrix $R_u$ received from the circuit 37. An initial error residual $r^0=h-R_u w^0$ is calculated. A counter i is set to the value 0. In the next step 413 the current best value $w_{best}$ of the weight vector is set to the initial guess value $w^0$ and stored in a memory cell 415 and the now calculated value of $SINR^0$ is set to be the current value of the variable $SINR_{max}$ and is stored in a memory cell 417 provided therefor. After executing these two initiating steps, the iterative process starts.

In the next step 419 a new iterated weight vector $w^{i+1}$ is calculated using e.g. a suitable function g that uses the residual $r^i$ as an argument according to $w^{i+1}=w^i+g(r^i)$. This can be performed by a module 421. The error residual $r^{i+1}=h-R_u w^{i+1}$ is also calculated in step 419. In the following step 423 and in the block 409 the value for the signal to interference plus noise ratio $SINR^{i+1}$ for the new weight vector is calculated. Then it is asked in step 425 whether the currently best value $SINR_{max}$ is smaller than the value $SINR^{i+1}$ now calculated. This can be performed by a comparator 427 taking the stored best SINR-value from the memory cell 417. If it is determined that the currently best value $SINR_{max}$ is smaller than the value $SINR^{i+1}$ now calculated, where this determining can be performed by a control unit 429, it is an indication that the best possible solution value has not yet been attained and then more iterations can possibly be made. Then, in a step 431 the best value variable $w_{best}$ is set to the now calculated $w^{i+1}$ and this new value is stored in the memory cell 415. Also, the now calculated SINR-value is maximum found and it is stored in the memory cell 417. The counter i is incremented in the following step 433.

Then it is decided in a step 435 whether now a sufficient number of iterations have been performed by comparing the current value of the counter i to the maximum number $N_{iter}$ that can e.g. be stored in a memory cell 437. If the value of i is not higher than $N_{iter}$, more iterations can be performed and next the step 419 is again performed. Instead, if the value of i is higher than the maximum $N_{iter}$ no more iterations will be performed and the current best vector $w_{best}$ is taken to be a sufficiently good guess of the weight vector. The calculation is terminated, as commanded by the control unit that also controls the execution of the steps in the various other modules, and the currently best vector $w_{best}$ is output to the traffic combiner circuit 35, see block 439.

If it is determined in step 425 that the that the currently best value $SINR_{max}$ is not smaller than the now calculated value $SINR^{i+1}$ the step 433 is directly executed in which the counter i is incremented whereupon it is determined whether a sufficient number of iterations have been performed as described above.

It is noted that the methods described herein do not suffer from the shortcomings discussed above for the empirical experimentation method and the adaptive stopping criteria method and should provide the best solution to problems of the form Rw=h in an iterative manner. As noted earlier, these problems arise in computing combining weights in CDMA communication receivers. Thus the methods described herein allow an efficient demodulation for terminals based on WCDMA or IS-2000.

While specific embodiments of the invention have been illustrated and described herein, it is realized that numerous other embodiments may be envisioned and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisioned without departing from the spirit and scope of the invention.

The invention claimed is:

1. A method, in a receiving equipment for demodulating received signals, the method comprising:
    performing a demodulation calculation, the performing further comprising
        iteratively calculating, in a plurality of successive iteration steps, coefficients or elements of a vector w to obtain a solution to a system of linear equations represented by a matrix equation Rw=h, wherein
            R is a matrix of known elements,
            h is a known vector, and
            the values of the coefficients or elements of the vector w are used by demodulating circuits in the receiving equipment to produce demodulated signals, and
        for each successive iteration step among the plurality of successive iteration steps, calculating a signal to interference plus noise ratio (SINR) for the received signals, after the received signals are demodulated using the values of the coefficients or elements of vector w calculated in each successive iteration step; and
    stopping the demodulation calculation using the SINR in a stopping condition or in a stopping algorithm.

2. The method according to claim 1, wherein the demodulating is performed in a RAKE receiver, wherein that the vector h is composed of net channel coefficients, the matrix R is an impairment covariance matrix and the vector w is a vector of combining weights.

3. The method according to claim 1, wherein the calculating the SINR further comprises:
    calculating the value of the SINR is, in each successive iteration step among the plurality of successive iteration steps, according to the ratio of signal power, computed as a function of $w^i$ and h, to interference plus noise power, computed as a function of $w^i$ and R, where i is the order number of the iteration step and the vector $w^i$ is the approximate value of the vector w calculated in this iteration step.

4. The method according to claim 1, further comprising
    comparing the value of the signal to interference plus noise ratio $SINR^i$ calculated in the $i^{th}$ iteration step to the value of the signal to interference plus noise ratio $SINR^{i-1}$ calculated in the directly preceding $(i-1)^{th}$ iteration step; and
    stopping the demodulation calculation further comprises
        stopping the demodulation calculation in the case where said value of the signal to interference plus noise ratio $SINR^i$ calculated in the $i^{th}$ iteration step is not greater than the value of the signal to interference plus noise ratio $SINR^{i-1}$ calculated in the directly preceding $(i-1)^{th}$ iteration step, and
    assigning the value of vector $w^i$ calculated in the $i^{th}$ iteration step is taken as a solution to the matrix equation.

5. The method according to claim 1, wherein
    a predetermined number $N_{iter}$ of iteration steps are performed, and that the value of the vector $w_{best}$ corresponding to the maximum $SINR_{max}$ of the values of the signal to interference plus noise ratio SINR calculated in all of the successive iteration steps is taken as the solution to the matrix equation.

6. A receiving equipment for receiving signals, the receiving equipment comprising:
   a decoding unit for demodulating received signals, the decoding unit further comprises
      a unit for performing a demodulation calculation, the unit for performing further comprising
         a unit for iteratively calculating, in a plurality of successive iteration steps, coefficients or elements of a vector w to obtain a solution to a system of linear equations represented by a matrix equation Rw=h, wherein
            R is a matrix of known elements,
            h is a known vector, and
            the values of the coefficients or elements of the vector w are used by demodulating circuits in the receiving equipment to produce demodulated signals, and
         a unit for calculating, for each successive iteration step among the plurality of successive iteration steps, a signal to interference plus noise ratio (SINR) for the received signals, after the received signals are demodulated using the values of the coefficients or elements of vector w calculated in each successive iteration step; and
         a control unit for stopping the demodulation calculation using the SINR in a stopping condition or in a stopping algorithm.

7. The receiving equipment according to claim 6, wherein the unit for calculating is adapted to calculate a value of the SINR, in each successive iteration step among the plurality of successive iteration steps, according to the ratio of signal power, computed as a function of $w^i$ and h, to interference plus noise power, computed as a function of $w^i$ and R, where i is the order number of the iteration step and the vector $w^i$ is the approximate value of the vector w calculated in this iteration step.

8. The receiving equipment according to claim 6, wherein the decoding unit is a RAKE receiver, the vector h being composed of net channel coefficients, the matrix R being an impairment covariance matrix and the vector w being a vector of combining weights.

9. The receiving equipment according to claim 6, further comprising:
   a comparator coupled to or included in the control unit and coupled to the unit for calculating, the comparator adapted to compare the value of the signal to interference plus noise ratio calculated in the $i^{th}$ iteration step to the value of the signal to interference plus noise ratio calculated in the directly preceding $(i-1)^{th}$ iteration step;
   the control unit being adapted to stop the iterative method in the case where the result of the comparing is that said value of the signal to interference plus noise ratio calculated in the $i^{th}$ iteration step is not greater than the value of the signal to interference plus noise ratio calculated in the directly preceding $(i-1)^{th}$ iteration step; and
   the control unit being adapted to take the value of vector $w^i$ calculated in the $i^{th}$ iteration step as the solution to the matrix equation.

10. The receiving equipment according to claim 6, further comprising
    a memory for storing the value of the signal to interference plus noise ratio calculated in each iteration step.

11. The receiving equipment according to claim 6, wherein
    the control unit is adapted to command that always a predetermined number $N_{iter}$ of successive iteration steps are performed, and
    the control unit is adapted to take the value of the vector $w_{best}$ corresponding to the maximum $SINR_{max}$ of the values of the signal to interference plus noise ratio calculated in all of said predetermined number $N_{iter}$ of successive iteration steps as a solution to the matrix equation.

12. The receiving equipment according to claim 11, further comprising
    a memory for holding the predetermined number $N_{iter}$ of iteration steps;
    a memory for holding the maximum $SINR_{max}$ of the values of the signal to interference plus noise ratio SINR calculated in the iteration steps up to the current iteration step; and
    a memory for holding the value of the vector $w_{best}$ corresponding to the maximum $SINR_{max}$ of the values of the signal to interference plus noise ratio.

* * * * *

UNITED STATES PATENT AND TRADEMARK OFFICE
CERTIFICATE OF CORRECTION

| | | |
|---|---|---|
| PATENT NO. | : 8,068,535 B2 | Page 1 of 1 |
| APPLICATION NO. | : 12/058494 | |
| DATED | : November 29, 2011 | |
| INVENTOR(S) | : Caims et al. | |

It is certified that error appears in the above-identified patent and that said Letters Patent is hereby corrected as shown below:

On the Face Page, in the figure, for Tag "301", in Line 5, delete "0 i = 1" and insert -- i = 1 --, therefor.

On the Face Page, in the figure, for Tag "313", box is incomplete.

On the Face Page, in the figure, for Tag "321", box is incomplete.

In Fig. 3a, Sheet 3 of 6, for Tag "301", in Line 5, delete "0 i = 1" and insert -- i = 1 --, therefor.

In Fig. 3a, Sheet 3 of 6, for Tag "313", box is incomplete.

In Fig. 3a, Sheet 3 of 6, for Tag "321", box is incomplete.

In Column 2, Line 39, delete "E" and insert -- $\varepsilon$ --, therefor.

In Column 2, Line 43, delete "E" and insert -- $\varepsilon$ --, therefor.

In Column 2, Line 63, delete "R," and insert -- $R_u$ --, therefor.

In Column 4, Line 60, delete "$[x_1^p x_2^p, ...]$" and insert -- $[x_1^p, x_2^p, ...]$ --, therefor.

In Column 4, Line 63, delete "$w^t$" and insert -- w --, therefor.

In Column 4, Line 65, delete "$[x_1^t x_2^t, ...]$" and insert -- $[x_1^t, x_2^t, ...]$ --, therefor.

In Column 6, Line 25, delete "$w^1$." and insert -- $w^i$. --, therefor.

In Column 7, Line 14, delete "$w^{1+1}$" and insert -- $w^{i+1}$ --, therefor.

Signed and Sealed this
Twenty-eighth Day of February, 2012

David J. Kappos
*Director of the United States Patent and Trademark Office*